US012556869B2

(12) United States Patent
Sreepadarao et al.

(10) Patent No.: US 12,556,869 B2
(45) Date of Patent: *Feb. 17, 2026

(54) MOTION DATA BASED SIGNAL PROCESSING

(71) Applicant: Oticon A/S, Smørum (DK)

(72) Inventors: Sudershan Yalgalwadi Sreepadarao, Smørum (DK); Anders Meng, Smørum (DK); Mojtaba Farmani, Smørum (DK); Martin Kuriger, Fribourg (CH); Mikkel Grønbech, Smørum (DK); Meng Guo, Smørum (DK)

(73) Assignee: Oticon A/S, Smørum (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/734,261

(22) Filed: Jun. 5, 2024

(65) Prior Publication Data

US 2024/0323614 A1 Sep. 26, 2024

Related U.S. Application Data

(63) Continuation of application No. 17/704,355, filed on Mar. 25, 2022, now Pat. No. 12,052,546.

(30) Foreign Application Priority Data

Mar. 26, 2021 (EP) .................................... 21165139

(51) Int. Cl.
*H04R 25/00* (2006.01)

(52) U.S. Cl.
CPC .......... *H04R 25/43* (2013.01); *H04R 25/507* (2013.01); *H04R 25/554* (2013.01)

(58) Field of Classification Search
CPC ........... H04R 2225/41; H04R 2225/61; H04R 2460/07; H04R 25/43; H04R 25/453;
(Continued)

(56) References Cited

U.S. PATENT DOCUMENTS 10,200,796 B2 * 2/2019 Künzle ................ H04R 25/453
10,743,121 B2 * 8/2020 Pontoppidan .......... A61B 5/293
(Continued)

FOREIGN PATENT DOCUMENTS

EP 2 884 766 B1 2/2018
EP 3787316 A1 * 3/2021 ............ H04R 25/00
(Continued)

*Primary Examiner* — Phylesha Dabney
(74) *Attorney, Agent, or Firm* — Birch, Stewart, Kolasch Birch, LLP

(57) ABSTRACT

A hearing aid includes an input unit, an output unit, a signal processing unit connected to said input unit and output unit, where the input unit, the signal processing unit and the output unit are forming part of a forward path of the hearing aid, where the signal processing unit is configured to apply a forward gain to the at least one electric input signal or a signal originating therefrom. The hearing aid further includes a feedback control unit configured to reduce a risk of howl due to acoustic, electrical, and/or mechanical feedback of an external feedback path from the output unit to the input unit of said hearing aid, where the hearing aid is configured to receive motion data characterising movement and/or acceleration and/or orientation and/or position of the hearing aid to control processing.

18 Claims, 6 Drawing Sheets

(58) Field of Classification Search
CPC .. H04R 25/507; H04R 25/552; H04R 25/554; H04R 2225/43
USPC .......................................................... 381/312
See application file for complete search history.

(56) References Cited

U.S. PATENT DOCUMENTS

| | | | | |
|---|---|---|---|---|
| 2014/0321682 | A1* | 10/2014 | Kofod-Hansen ...... | H04R 25/30 381/315 |
| 2016/0249139 | A1 | 8/2016 | Kristensen et al. | |
| 2017/0180878 | A1* | 6/2017 | Petersen .............. | H04R 25/453 |
| 2019/0025813 | A1 | 1/2019 | Cella et al. | |
| 2019/0132686 | A1* | 5/2019 | Kuriger ................ | H04R 25/505 |
| 2020/0077204 | A1 | 3/2020 | Pedersen et al. | |
| 2022/0312129 | A1 | 9/2022 | Guo et al. | |

FOREIGN PATENT DOCUMENTS

| | | | | |
|---|---|---|---|---|
| EP | 3955594 | A1 * | 2/2022 | ............. H04R 25/45 |
| EP | 4064731 | A1 * | 9/2022 | ........... H04R 25/505 |
| JP | 2011-188334 | A | 9/2011 | |

* cited by examiner

MOTION DATA BASED SIGNAL PROCESSING

This application is a Continuation of copending application Ser. No. 17/704,355, filed on Mar. 25, 2022, which claims priority under 35 U.S.C. § 119(a) to Application No. 21165139.3, filed in Europe on Mar. 26, 2021, all of which are hereby expressly incorporated by reference into the present application.

SUMMARY

The present application relates to a hearing aid configured to be worn by a hearing aid user at or in an ear of the hearing aid user or to be fully or partially implanted in the head at an ear of a hearing aid user.

The present application further relates to a method of operating a hearing aid.

A Hearing Aid

The present disclosure relates to the well-known acoustic feedback problem in audio systems comprising a forward path for amplifying an input sound from the environment picked up by an acoustic input transducer and an output transducer for presenting an amplified version of the input signal as an output sound to the environment, e.g. to one or more users.

Acoustic feedback problems occur due to the fact that the output loudspeaker signal of a hearing aid system is partly returned to the input microphone via an acoustic coupling, e.g. through the air. The part of the loudspeaker signal returned to the microphone is then re-amplified by the system before it is re-presented at the loudspeaker, and again returned to the microphone, etc. As this cycle continues, the effect of acoustic feedback becomes audible as artefacts or even worse, howling, when the system becomes unstable. The problem appears typically when the microphone and the loudspeaker are placed closely together, as in hearing aids, and often causes significant performance degradation.

Unstable systems due to acoustic feedback tend to significantly contaminate the desired audio input signal with narrow band frequency components, which are often perceived as howl or whistle.

Acoustic feedback problems may occur in situations such as when the user is yawning and chewing. This can cause feedback artefacts in hearing aids, and it is a difficult problem to resolve as the changes can happen rapidly and constantly. Such an event that causes a feedback path change is difficult to detect for a feedback control system, before it is too late, from the hearing aid point of view.

Accordingly, there is a need for an improved feedback control system assisted by an identification of feedback provoking events.

In an aspect of the present application, a hearing aid configured to be worn by a hearing aid user at or in an ear of the hearing aid user or to be fully or partially implanted in the head at an ear of a hearing aid user is provided.

The hearing aid may comprise an input unit.

The input unit may be configured to receive an input sound signal from an environment of a hearing aid user.

The input unit may be configured to provide at least one electric input signal representing said input sound signal.

The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 KHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz.

The hearing aid may comprise an output unit.

The output unit may be configured to provide at least one set of stimuli perceivable as sound (an acoustic signal) to the hearing aid user based on a processed version of said at least one electric input signal.

The output unit may comprise a number of electrodes of a cochlear implant (for a CI type hearing aid) or a vibrator of a bone conducting hearing aid.

The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid).

The hearing aid may comprise a digital-to-analogue (DA) converter to convert a digital signal to an analogue output signal, e.g. for being presented to a user via an output transducer.

The hearing aid may comprise a signal processing unit.

The signal processing unit may be connected to the said input unit and output unit.

The term connected to may refer to the signal processing unit being connected and/or coupled mechanically to said input unit and output unit. The term connected to may refer to that the signal processing unit being operationally connected and/or coupled to said input unit and output unit so that e.g. electrical signals may be transferred from one to the other.

The signal processor may be configured to enhance the input signals from the input unit and providing a processed output signal to the output unit.

The hearing aid (the signal processor of the hearing aid) may be adapted to provide a frequency dependent gain and/or a level dependent compression and/or a transposition (with or without frequency compression) of one or more frequency ranges to one or more other frequency ranges, e.g. to compensate for a hearing impairment of a user.

The input unit, the signal processing unit, and the output unit may be forming part of a forward path of the hearing aid.

The hearing aid may comprise the 'forward' (or 'signal') path for processing an audio signal between the input and an output of the hearing aid.

The signal processor (signal processing unit) may be located in the forward path. The signal processor may be adapted to provide a frequency dependent gain according to the hearing aid user's particular needs (e.g. hearing impairment).

The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

The signal processing unit may be configured to apply a forward gain to the at least one electric input signal or a signal originating therefrom.

The forward gain may be a frequency—and/or level-dependent forward gain.

The hearing aid may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path, but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise a feedback control unit.

The feedback control unit may be configured to reduce a risk of howl due to acoustic, electrical, and/or mechanical feedback of an external feedback path from the output unit to the input unit of said hearing aid.

The hearing aid may be configured to receive motion data characterising movement and/or acceleration and/or orientation and/or position of the hearing aid.

The term receive may refer to that the hearing aid itself provides motion data, e.g. by the hearing aid comprising a motion detector.

The term receive may refer to that the hearing aid receives motion data from another device, e.g. from an auxiliary device which e.g. comprises a motion detector.

The term "movement and/or acceleration" includes both linear and angular position, velocity and acceleration. Thus, "movement and/or acceleration" may include position, orientation as well as the first and second derivative (e.g. with respect to time) of these. The term "orientation" may e.g. indicate a direction in a stationary coordinate system relative to the earth, or relative to a reference direction, e.g. a direction of the force of gravity, on a particular location on (the surface of) the earth. A "position" of a device may e.g. indicate a set of coordinates in a stationary coordinate system relative to the earth, e.g. the surface of the earth (e.g. GPS-coordinates). These quantities may be expressed in any coordinate system and by means of any unit.

The hearing aid may be configured to control processing of the feedback control unit based on the received motion data.

Control processing of the feedback control unit may refer to e.g. control of the type of feedback control used (e.g. use of a feedback cancellation unit and/or of a feedback reduction unit), the level of feedback control (i.e. the adaptation speed, magnitude, etc.), etc.

Accordingly, a hearing aid is provided, where the feedback control unit of the hearing aid may be assisted by motion data.

The feedback control unit may be located in the forward path of the hearing aid.

The feedback control unit may be located in the analysis path of the hearing aid.

The feedback control unit may be located in the forward path and in the analysis path of the hearing aid.

The hearing aid may comprise at least one combination unit configured to combine (e.g. by subtraction and/or summation) two of more input signals to one output signal.

The hearing aid may comprise an own voice detector (OVD) for repeatedly estimating whether or not, or with what probability, said at least one electric input signal, or a signal derived therefrom, comprises a speech signal originating from the voice of the hearing aid user.

The hearing aid may comprise a voice activity detector (VAD) for repeatedly estimating whether or not, or with what probability, said at least one electric input signal, or a signal derived therefrom, comprises one or more speech signals (e.g. from speech sound sources other than the hearing aid user).

The hearing aid may comprise a noise reduction system.

Said noise reduction system may be configured to attenuate a noise signal in the at least one electric input signal at least partially.

The hearing aid may comprise one or more beamformers.

The input unit may be configured to provide at least two electric input signals connected to the one or more beamformers.

The one or more beamformers may be configured to provide at least one beamformed signal.

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in literature. The minimum variance distortionless response (MVDR) beamformer is widely used in microphone array signal processing. Ideally, the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The signal processing unit may comprise one or more of a compression unit for providing compression of the electric input signal, the noise reduction system, and the one or more beamformers.

The hearing aid may be further configured to control processing of the signal processing unit based on the received motion data.

Control processing of the signal processing unit may refer to controlling the frequency dependent gain and/or a level dependent compression and/or a transposition (with or without frequency compression) of one or more frequency ranges to one or more other frequency ranges, e.g. to compensate for a hearing impairment of a user.

Control processing of the signal processing unit may be based on detecting own voice of the hearing aid user by the OVD.

Control processing of the signal processing unit may be based on detecting one or more speech signals by the VAD.

Control processing of the signal processing unit may refer to controlling the noise reduction system.

Control processing of the signal processing unit may refer to controlling the one or more beamformers.

The hearing aid may further comprise a control unit.

The control unit may be configured to control said processing of the feedback control unit based on the received motion data.

The control unit may be configured to control said processing of said signal processing unit based on the received motion data.

The control unit may receive information from one or more of the elements of the signal processing unit (e.g. the compression unit, the noise reduction system, and/or of the one or more beamformers) and/or from the feedback control unit.

Thereby, the signal processing unit and the feedback control unit may be optimally controlled based on a combined input from several sensors/detectors.

The hearing aid may be configured to determine the hearing aid as being in one of a plurality of different modes based on the received motion data.

The control unit may be configured to determine the hearing aid as being in one of a plurality of different modes based on the received motion data.

In other words, the hearing aid and/or the control unit may determine which of a plurality of different modes, the hearing aid is in.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The hearing aid may be configured to control said processing of the feedback control unit based on said determined mode of the hearing aid.

The control unit may be configured to control said processing of the feedback control unit based on said determined mode of the hearing aid.

The determination of the hearing aid as being in one of a plurality of different modes may be based on a neural network (machine learning/AI, e.g. a neural network processor).

The hearing aid may comprise the neural network, such as a deep neural network.

The training of the neural network may be carried out in a server, such as a cloud server. Thereby, the training may be distributed to a server and the hearing aid may receive a trained version of the neural network for mode determination.

The training of the neural network may be carried out at least partly in an external/auxiliary device, such as a mobile device. Thereby, the training may be distributed at least partly to an external device and the hearing aid may receive a trained version of the neural network for mode determination.

As training a neural network may be computationally intensive, carrying out the training outside the hearing aid such as in a server or in an external/auxiliary device may reduce the power consumption of the hearing aid.

For example, the neural network may be trained prior to the hearing aid user takes the hearing aid into use, such as in the product development phase based on e.g. prototype motion data and a library of corresponding specific motion data so that a good default version of the parameters (weights) of the neural network are available after the time of initial training of the neural network. The parameters (weights) of the neural network may be updated/further trained at regular intervals, such as when handed in for service.

For example, a (deep) neural network may transform the input signal using N samples/coefficients into the same type of N output samples/coefficients. The neural network may be a traditional feed-forward DNN with no memory, or a Long Short-Term Memory (LSTM) or Convolutional Recurrent Neural Network (CRNN), which both contain memory and thus are able to learn from previous input samples.

The determination of the hearing aid as being in one of a plurality of different modes may comprise determination of the hearing aid as being in a head movement mode.

For example, certain head/torso movements/motions may be critical for the feedback control unit to handle. Such head/torso movements may e.g. be when tilting of the head of the hearing aid user so that left car moves towards the left shoulder and/or the right car moves towards the right shoulder. For example, in such a situation, the motion data may e.g. be characterised by a rotation of the head around an axis parallel to the horizontal plane and a movement of the head in the vertical plane seen from the user.

When the hearing aid is already fitted to the maximum level of supported gain, this critical head movement may lead to (minor) feedback related sound artifacts being heard by the hearing aid user.

When motion data indicate such a movement, a quick reaction by reducing the forward gain of the hearing aid may prevent feedback related sound artifacts.

For example, a head movement mode may comprise reducing the forward gain of the hearing aid.

For example, a head movement mode may comprise that the feedback control unit accelerate the feedback adaptation. Thereby, the head tilting movement may be tracked by the feedback cancellation unit of the feedback control unit.

For example, a head movement mode may comprise that the feedback control unit applies an STM pattern (a modulation of said forward gain in time related to a filler signal) in a feedback reduction unit of the feedback control unit.

The determination of the hearing aid as being in one of a plurality of different modes may comprise determination of the hearing aid as being in a conversation mode.

For example, when the motion data indicate repeatedly moderate head (turning/rotation) movements in the horizontal plan seen from the user, e.g. combined with the VAD in hearing aid (typically as a part of beamformer and noise reduction processing) detecting speech signal, and additionally when the OVD also indicates speech activity of the user, the hearing aid user is likely having a conversation.

In a conversation mode, the priority could be speech understanding, and the gain/amplification (in the compression unit) in the hearing aid may be high (on target gain), and the one or more beamformers and the noise reduction systems may be "aggressive" as they might modify the gain quickly, especially if it is a speech in noise situation.

Hence, the feedback control system may be in a mode where the hearing aid stability is the priority due to the feedback challenging situations in terms of high gain and rapid gain changes. In a conversation mode, the feedback cancellation unit could be in a mode, which is less sensitive to forward gain changes (due to aggressive noise reduction).

For example, a conversation mode may comprise applying de-correlation measures in the forward path (e.g. in the feedback reduction unit). For example, de-correlation measures may comprise small amount of frequency shifting. Thereby, the de-correlation measure may help to maintain a more stable hearing aid, while very little sound quality degradation is imposed to the speech signals, if used correctly.

The determination of the hearing aid as being in one of a plurality of different modes may comprise determination of the hearing aid as being in an active mode.

For example, when motion data indicate that there are heavy body (and head) movements, the user may be in an active situation, e.g., by performing sport. For example, the motion data may indicate high acceleration in the horizontal and/or vertical plane seen from the user.

In such a situation, providing hearing aid stability may be a problem, as the body and head movements may trigger significant very quick feedback path changes, which may lead to hearing aid stability problems. The feedback control unit may therefore be in a mode, where the hearing aid stability is the priority.

Furthermore, the one or more beamformers may preferably be in an omni directional mode to ensure the user can hear all sound signals in a natural way, and the noise reduction system does not need to provide aggressive noise reduction, and the gain/amplification provided by the compression unit may be even reduced a bit (e.g., by 6 dB) to ensure the hearing aid stability. In an active mode, the feedback cancellation unit could be in a mode, which is less sensitive to forward gain changes (due to aggressive noise reduction).

For example, an active mode may comprise applying de-correlation measures in the forward path (e.g. in the feedback reduction unit). For example, de-correlation measures may comprise small amount of frequency shifting. Thereby, the de-correlation measure may help to maintain a more stable hearing aid, while very little sound quality degradation is imposed to the speech signals, if used correctly.

The determination of the hearing aid as being in one of a plurality of different modes may comprise determination of the hearing aid as being in a jaw movement mode.

For example, when motion data indicate a jaw movement, a continuous change of the acoustic feedback path may be triggered, which may lead to feedback related problems.

Motion data indicating jaw movement may be characterised by micro movements in the x-, y-, and of z-direction, and/or by a rotation around an axis parallel to the horizontal plane seen from the user.

In a jaw movement mode, system stability as such may likely not to be a problem, but due to the continuous change of the acoustic feedback path and that the feedback control system may always be lacking behind these changes, it may lead to sound quality degradations as the hearing aid may likely be in a sub-oscillation condition (close to instability, but still just stable). For example, a jaw movement mode may comprise the feedback control unit being in a faster adapting mode to reduce the effect of these sound signal quality degrading sub-oscillations. For example, a jaw movement mode may comprise the signal processing unit being configured to reduce the gain by a small amount, to bring the hearing aid away from the sub-oscillation condition.

The determination of the hearing aid as being in one of a plurality of different modes may comprise determination of the hearing aid as being in a playing instruments mode.

For example, the motion data may indicate that the hearing aid user is playing a musical instrument.

Motion data indicating that the hearing aid user is playing a musical instrument may be characterised by repetitive movements of the head of the hearing aid user.

Modern hearing aids may degrade sound quality especially for music signals as a consequence of the feedback control units.

Hence, when motion data indicate that the hearing aid user is playing a musical instrument, the feedback control unit may be in a transparent setting that affects sound quality on minimum level. Transparent setting may refer to a hearing aid that may occlude the car and include all component of a hearing aid, but may be operated in a basis mode where the overall transfer characteristics to the eardrum are comparable to an open car. The subjective listening impressions are supposed to be alike to the open car, and the hearing aid may become transparent with respect to the user's perception.

Furthermore, the sound level may typically be (very) high in a playing instruments mode, and there may be no (strong) need to amplify the sound. The sound processing unit may be configured to apply an extra gain reduction in order to maintain hearing aid stability, as a feedback control unit in the transparent setting typically has limited effect.

For example, a playing instruments mode may comprise the feedback control unit (e.g. the feedback cancellation unit and/or the feedback reduction unit) being turned off. Thereby, a transparent setting is achieved.

In case the hearing aid does not determine the hearing aid as being in one of a plurality of different modes, the hearing aid (the feedback control unit and the signal processing unit) may be operated at predetermined conditions (a 'normal mode'), e.g. according to the standard settings from initial/regular fitting of the hearing aid.

The hearing aid may further comprise at least one motion detector configured to provide said motion data.

The at least one motion detector may be configured to provide motion data characterising movement and/or acceleration and/or orientation and/or position of the hearing aid. The movement and/or acceleration and/or orientation and/or position may be provided in an x-, y-, and z-coordinate system relative to the hearing aid user.

For example, the at least one motion detector may comprise and/or constitute an accelerometer and/or a gyroscope.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively, or additionally, one or more detectors may form part of an external/auxiliary device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic)
b) the current acoustic situation (input level, feedback, etc.)
c) the current mode or state of the user (movement, temperature, cognitive load, etc.)
d) the current mode or state of the hearing aid (program selected, time elapsed since last user interaction, etc.) and/or of another device in communication with the hearing aid.

The feedback control unit may comprise a feedback reduction unit (FBRU) configured to modulate said forward gain in time.

The feedback reduction unit may be configured to modulate said forward gain in time to provide that the forward gain exhibits an increased forward gain $A_H$ in one or more first time periods $T_H$ and a reduced forward gain $A_L$ in one or more second time periods $T_L$.

In other words, the feedback reduction unit may be configured to provide an STM resulting signal.

The terms 'the increased forward gain $A_H$' and 'the reduced forward gain $A_L$' are intended to mean increased and reduced, respectively, relative to a requested gain (at a given point in time (in a time-domain representation) or at a given point in time and frequency (in a time-frequency representation)). The term 'a requested gain' is in the present context taken to mean the gain that is to be applied to the electric input signal to provide an intended amplification of the electric input signal (e.g. to compensate for a user's hearing impairment and/or to compensate for a noisy environment, etc.). In general, the feedback reduction unit may be configured to modulate the requested frequency dependent forward gain in time, to provide that the resulting forward gain is higher than the requested gain in some periods of time and lower than the requested gain in other periods of time.

Thereby, as the increased forward gain $A_H$ and the reduced forward gain $A_L$ are intended to mean increased and reduced, respectively, relative to a requested gain, the feedback reduction unit is configured to conserve energy in the resulting signal of the feedback reduction unit compared to the signal before/received by the feedback reduction unit.

The feedback control unit may comprise a feedback cancellation unit.

The feedback cancellation unit may comprise an adaptive filter.

For example, the adaptive filter may comprise algorithm and filter units.

The feedback control unit may be configured to increase and/or decrease the adaptation speed of the adaptive filter based on said determined mode.

The feedback cancellation unit may comprise a feedback estimation unit (FBE) comprising the adaptive filter, where the FBE may be configured to estimate the acoustic feedback path (FPB) from the output transducer (OT) to the input transducer (IT).

The hearing aid may comprise a filler signal unit.

The filler signal unit may be configured to generate a filler signal.

The filler signal unit may be configured to provide said filler signal to the resulting signal of the feedback reduction unit in said one or more second time periods $T_L$, corresponding to said reduced forward gain $A_L$.

However, even though the STM pattern is very efficient to break acoustic feedback loop, and thereby makes it possible to remove feedback whistling sounds even before it becomes audible, the resulting STM processed sound may be audible to some users.

Accordingly, the present disclosure has the advantage of making the STM processed signal less audible. This may be done by adding said filler signal to the gaps (i.e. with reduced forward gain) in the STM pattern. This gap-filler signal makes the modulated signal sound smoother and hence reduces the audibility of STM processed signal. Thereby, an improved hearing aid may be provided.

The filler signal unit may be located in an analysis path of the hearing aid.

The filler signal unit may be connected/coupled (e.g. operationally) to the feedback reduction unit of the hearing aid.

The filler signal unit may be connected/coupled (e.g. operationally) to the combination unit of the hearing aid.

The filler signal unit may be configured to receive a signal from said feedback reduction unit. For example, the filler signal unit may be configured to receive a resulting signal from the feedback reduction unit, where the resulting signal is a modulated forward gain signal.

The filler signal unit may be configured to provide a filler signal to the combination unit of the hearing aid. The combination unit is configured to combine said filler signal and the resulting signal from the feedback reduction unit.

One or more of said increased forward gain $A_H$, reduced forward gain $A_L$, one or more first time periods $T_H$, and one or more second time periods $T_L$ may be based (e.g. may be determined) according to a predetermined criterion.

One or more of said increased forward gain $A_H$, reduced forward gain $A_L$, one or more first time periods $T_H$, and one or more second time periods $T_L$ may be based (e.g. may be determined) according to an adaptively determined criterion.

The forward path and the external feedback path of the hearing aid may define a loop path exhibiting a roundtrip loop delay.

For example, the roundtrip loop delay may be around 10 ms, such as in the range between 2 ms and 10 ms. For example, the roundtrip loop delay may be 0 ms. The roundtrip loop delay may be relatively constant over time and may e.g. be determined in advance of operation of the hearing aid, or be dynamically determined during use.

The criterion (predetermined criterion) may comprise that said one or more first time periods $T_H$ and said one or more second time periods $T_L$ time period are based in dependence of said, possibly averaged, roundtrip loop delay of said forward path and external feedback path.

Said criterion may comprise that said one or more first time periods $T_H$ or said one or more second time periods $T_L$ are based in dependence of said, possibly averaged, roundtrip loop delay of said forward path and external feedback path.

The hearing aid may be configured to provide that said increased gain $A_H$ and/or said reduced gain $A_L$ are only applied in frequency bands expected to be at risk of howl.

The frequency band or bands expected to be at risk of howl may e.g. be estimated or determined in advance of normal operation of the hearing aid, e.g. at a fitting session, where the hearing aid may be configured/adapted to a particular hearing aid user's needs (e.g. the hearing e.g. to compensate for a hearing impairment of the user). Alternatively, or additionally, frequency band or bands expected to be at risk of howl may e.g. be selected automatically online, e.g. determined by a feedback detector for estimating a current level of feedback in a given frequency band.

Consequently, the filler signal unit may generate said filler signal according to this specific frequency pattern and provide it to the resulting signal (e.g. of the feedback reduction unit) in the second time period $T_L$ corresponding to the reduced gain $A_L$.

The filler signal may be independent or dependent on the STM pattern.

In other words, the filler signal unit may be configured to generate a filler signal based on the modulated forward gain from the feedback reduction unit.

In other words, the filler signal unit may be configured to generate a filler signal independent from the modulated forward gain from the feedback reduction unit.

The filler signal unit may be configured to provide a filler signal of equal numerical value as the difference in forward gain between successively modulated increased forward gain $A_H$ and reduced forward gain $A_L$.

Thereby, the filler signal may be considered to be added in an "open-loop" manner (i.e., the filler signal will not travel around the feedback loop forever.

The filler signal unit may be configured to provide a filler signal smaller than the difference in forward gain between successively modulated increased forward gain $A_H$ and reduced forward gain $A_L$.

Thereby, the filler signal may have a negative loop gain (<0 dB), so that it will not build up to create feedback, and further may improve the adaptive estimation of the feedback path, as the added filler signal further decorrelates the signals for an adaptive estimation of feedback path. The filler signal unit may be configured to adaptively adjusting (e.g. adaptively determining) the size of the filler signal in the plurality of second time period $T_L$ corresponding to the reduced gain $A_L$.

Generating a filler signal may comprise providing an additional electric input signal representing sound to said resulting signal of the feedback reduction unit.

The filler signal may be based on a noise signal.

The filler signal may be independent or dependent on the STM pattern.

The magnitude/size of the noise signal may be computed based on the reduced forward gain $A_L$ of the resulting signal from the feedback reduction unit.

The magnitude/size of the noise signal may be of equal numerical value as the difference in forward gain between successively modulated increased forward gain $A_H$ and reduced forward gain $A_L$.

The filler signal may be based on a noise signal, e.g. random noise generated depending on the corresponding original signal in the time period $T_L$ corresponding to the lowered gain $A_L$.

The filler signal may be based on the input sound signal from the environment of a hearing aid user.

In other words, the filler signal unit may be configured to receive at least part of the input sound signal and/or of the at least one electric input signal representing said input sound signal, and be configured to apply said input sound signal and/or electric input signal (possibly enhanced) as filler signal.

The hearing aid (e.g. the signal processing unit and/or the filler signal unit) may be configured to determine whether the input sound signal comprises one or more speech signals and/or a noise signal.

In response to the hearing aid (e.g. the signal processing unit and/or the filler signal unit) determines that the input sound signal comprises one or more speech signals, the filler signal unit may be configured to reconstruct a synthesize speech signal, based on a speech signal model.

The filler signal unit may be configured to reconstruct a synthesize speech signal resembling the one or more speech signals.

The filler signal unit may be configured to provide a filler signal based on the reconstructed a synthesize speech signal.

Thereby, the filler signal unit may provide a filler signal, which sounds (resembles) more like the original speech signal and thereby is perceived less disturbing by the user.

In response to the hearing aid (e.g. the signal processing unit and/or the filler signal unit) determines that the input sound signal comprises a noise signal, the filler signal unit may be configured to create a filler signal based on the noise signal.

The filler signal unit may be configured to create filler signal with similar properties as the noise signal.

Similar properties may refer to similar spectral shaping and/or similar intensity level, etc. as the noise signal.

The filler signal unit may be configured to synthesize a filler signal based on the magnitude (e.g. the sound pressure level (SPL)) of the input sound signal.

The filler signal unit may be configured to synthesize a filler signal based on the magnitude of the input sound signal, but based on a random phase.

The filler signal unit may be configured to estimate the size of the filler signal, based on the resulting signal from the feedback reduction unit.

For example, the size of the filler signal may comprise a bandwidth of 1000 Hz or more. For example, the size of the filler signal may comprise a bandwidth in the range of 500-2500 Hz. For example, the size of the filler signal may comprise an amplitude of 5 dB, 10 dB, 20 dB, 50 dB, or 100 dB, or less than 100 dB.

The filler signal unit may be configured to estimate the duration of the filler signal, based on the resulting signal from the feedback reduction unit.

The duration of the filler signal may depend on how long the STM pattern has been applied. For example, the duration of the filler signal may be 50 ms-500 ms (however depending on the underlying feedback reduction unit).

The filler signal unit may be configured to estimate the periodicity of the filler signal, based on the resulting signal from the feedback reduction unit.

For example, the periodicity of the filler signal may depend on the feedback loop delay (e.g. as 1/(loop delay).

The filler signal unit may be configured to estimate the size, duration and/or periodicity of the filler signal based on advanced signal processing.

Advanced signal processing may refer to temporal-spectral masking techniques to determine the power of the filler signal.

Advanced signal reconstruction techniques may be advantageous with the aim of making the filler signal resemble the original unprocessed signal to a high degree.

The filler signal unit may be configured to estimate the size, duration and/or periodicity of the filler signal based on a neural network.

Thereby, as the filler signal may be considered to be applied in an open loop manner, it has no or little impact on feedback elimination effect of the STM pattern.

The hearing aid may further comprise an analysis filter bank.

The analysis filter bank may provide that the electric input signal is divided into a number of frequency bands (e.g. 4, 8, or 64 bands) as band split electric input signals.

The hearing aid may further comprise a synthesis filter bank.

The filler signal unit of the hearing aid may be configured to generate a band split filler signal. The filler signal unit of the hearing aid may be configured to provide said filler signal to a resulting band split signal of the feedback reduction unit.

Thereby, the filler signal may be added to each of the relevant frequency bands.

In other words, the hearing aid, e.g. the input unit, and/or the antenna and transceiver circuitry may comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may comprise antenna and transceiver circuitry allowing a wireless link to an entertainment device (e.g. a TV-set), a communication device (e.g. a telephone), a wireless microphone, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal and/or information regarding the modulated forward gain and/or the generated filler signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHZ, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology).

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g.

The hearing aid may comprise a hearing instrument, e.g. a hearing instrument adapted for being located at the ear or fully or partially in the ear canal of a user, e.g. a headset, an earphone, an ear protection device or a combination thereof. The hearing assistance system may comprise a speakerphone (comprising a number of input transducers and a number of output transducers, e.g. for use in an audio conference situation), e.g. comprising a beamformer filtering unit, e.g. providing multiple beamforming capabilities.

Use

In an aspect, use of a hearing aid as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

Use may be provided in a system comprising audio distribution, e.g. a system comprising a microphone and a loudspeaker in sufficiently close proximity of each other to cause feedback from the loudspeaker to the microphone during operation by a user.

A Method

In an aspect, a method of processing an electric input signal representing sound is provided.

The method may comprise receiving an input sound signal from an environment of a hearing aid user, by an input unit.

The method may comprise providing at least one electric input signal representing said input sound signal, by an input unit.

The method may comprise providing at least one set of stimuli perceivable as sound to the hearing aid user based on a processed version of said at least one electric input signal, by an output unit.

A signal processing unit (or compression unit of the signal processing unit) may be connected to said input unit and output unit.

The input unit, the signal processing unit and the output unit may form part of a forward path of the hearing aid.

The method may comprise applying a forward gain to the at least one electric input signal or a signal originating therefrom, by the signal processing unit.

The hearing aid may further comprise a feedback control unit for reducing a risk of howl due to acoustic, electrical, or mechanical feedback of an external feedback path from the output unit to the input unit of said hearing aid.

The method may comprise receiving motion data.

The motion data may be characterising movement and/or acceleration and/or orientation and/or position of the hearing aid.

The method may comprise controlling processing of the feedback control unit based on the received motion data.

It is intended that some or all of the structural features of the hearing aid described above, in the 'detailed description of embodiments' or in the claims can be combined with embodiments of the method, when appropriately substituted by a corresponding process and vice versa. Embodiments of the method have the same advantages as the corresponding hearing aid.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A computer program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND an auxiliary device is moreover provided.

In a further aspect, a hearing system comprising left and right hearing aids is provided.

The left and right hearing aids may be configured to be worn in or at left and right ears, respectively, of said hearing aid user, and/or to be fully or partially implanted in the head at left and right ears, respectively, of the hearing aid user.

The left and right hearing aids may be configured to establish a wired or wireless connection between them allowing data to be exchanged between them.

Data may refer to information/raw data relating to audio signals of the hearing aid and/or to the sensor data, e.g. the motion data, of the hearing aid, and/or control signals, and/or status signals, etc.

The hearing system may further comprise an auxiliary device.

The hearing system may be configured to establish a communication link between the hearing aid(s) and the auxiliary device to provide that information/raw data can be exchanged or forwarded from one to the other.

As stated above, it is contemplated that the hearing system may also just comprise one hearing and an auxiliary device.

The auxiliary device may comprise at least one motion detector configured to provide said motion data.

The auxiliary device may comprise a control unit configured to control said processing of the feedback control unit and/or of said signal processing unit based on the received motion data.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on a cellular phone, e.g. a smartphone, or on another portable device allowing communication with said hearing aid or said hearing system.

Definitions

In the present context, a hearing aid, e.g. a hearing instrument, refers to a device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle car as well as electric signals transferred directly or indirectly to the cochlear nerve of the user.

The hearing aid may be configured to be worn in any known way, e.g. as a unit arranged behind the car with a tube leading radiated acoustic signals into the car canal or with an output transducer, e.g. a loudspeaker, arranged close to or in the car canal, as a unit entirely or partly arranged in the pinna and/or in the car canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically or optically) with each other. The loudspeaker may be arranged in a housing together with other components of the hearing aid, or may be an external unit in itself (possibly in combination with a flexible guiding element, e.g. a dome-like element).

A hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system), and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

Figure 1:
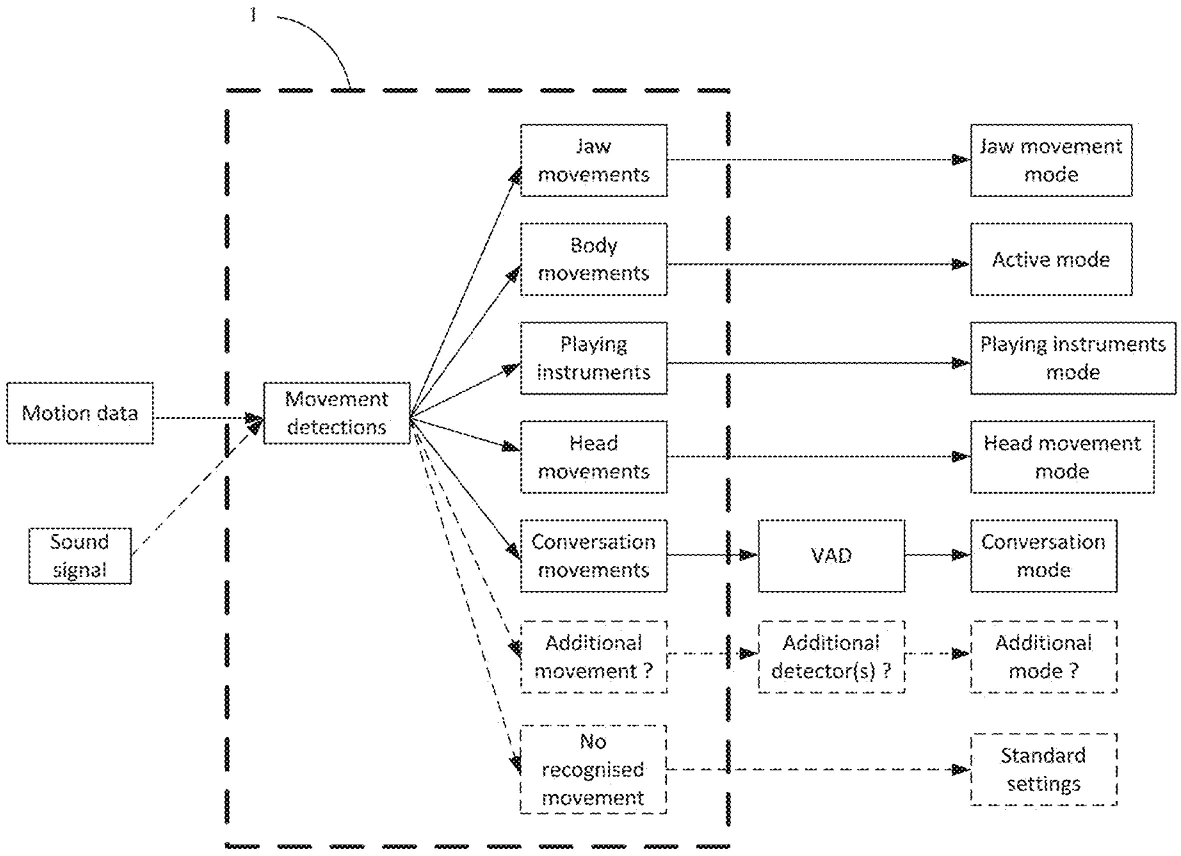
FIG. 1 shows an exemplary determination of a hearing aid as being in one of a plurality of different modes.

FIG. 1 shows an exemplary determination of a hearing aid as being in one of a plurality of different modes.

In FIG. 1, it is illustrated that the determination may be based on motion data ('motion data') as input data. The motion data may be detected/measured by a motion detector, which may e.g. be an accelerometer and/or a gyroscope. The motion detector may be arranged/installed in a hearing aid. Alternatively, or additionally, the motion detector may be arranged/installed in an auxiliary device, which may be communicate with the hearing aid (via a wired or wireless connection).

Additionally, the determination may be based on an input sound signal ('Sound signal') from an environment of the hearing aid, and/or e.g. in the form of at least one electric input signal representing said input sound signal.

Based on the (raw) motion data and possibly the sound signal, a feedback control unit of the hearing aid may detect and/or determine ('Movement detections') the type of movements present in the motion data.

In FIG. 1, it is shown that the movement detection and/or determination may end up with a determination of jaw movements ('Jaw movements', e.g. when a hearing aid user is chewing or yawning), body movements ('Body movements', e.g. when a hearing aid user is being active by e.g. playing sports), playing instruments ('playing instruments', e.g. when a hearing aid user is playing an instrument), head movements ('Head movements', e.g. when a hearing aid user is stretching his/her neck by moving the head towards the shoulder(s) or chest), and/or conversation movements ('Conversation movements', e.g. when a hearing aid user is having a conversation).

The movement detection and/or determination from motion data may be based on a trained neural network 1 (e.g. a deep neural network), where the neural network may have been trained prior to initial use of the hearing aid, based on a library of motion data and movements (jaw, body, etc.) so that movements of the hearing aid user may be identified in motion data received during use of the hearing aid. The neural network 1 may also be continuously trained e.g. during use or service of the hearing aid.

Alternatively, a control unit may carry out the movement detection and/or determination from the motion data.

Based on the detected and/or determined movement, the feedback control unit or the control unit may determine corresponding modes of the feedback control unit and, possibly, of the signal processing unit of the hearing aid. In other words, when jaw movements ('Jaw movements') are detected and/or determined, then the feedback control unit and, possibly, of the signal processing unit may be set to a jaw movement mode ('Jaw movement mode'). Similarly, body movements may result in an active mode ('Active mode'), playing instruments may result in a playing instruments mode ('Playing instruments mode'), head movements may result in a head movements mode ('Head movements mode'), and conversation movements may result in a conversation mode ('Conversation mode').

As shown in FIG. 1, each of the movements may be combined with additional detector signals before a mode is determined. In the case of conversation movements, the determination of mode may also be based on a voice activity detector ('VAD') detecting a speech sound signal in the input sound signal. Additionally, the determination may also be based on an OVD detecting a speech signal of the hearing aid user, which would indicate that the hearing aid user is taking part in a conversation.

Based on the determined mode, the feedback control unit and, possibly, of the signal processing unit may be set according to predetermined settings of the determined mode.

For example, in the conversation mode ('Conversation mode'), the priority could be speech understanding, and the gain/amplification (in the compression unit) in the hearing aid may be high (on target gain), and the beamformer and the noise reduction system may be "aggressive" as they might modify the gain quickly especially if it is a speech in noise situation. Further, the feedback control system may be set to handle feedback challenging situations in terms of high gain and rapid gain changes.

Also, in FIG. 1, it is shown that additional movements may also be detected and/or determined, and possibly combined with additional detector signals, e.g. from a physiological sensor, to determine an additional mode.

In case no movement is recognised, or an unknown movement is detected, the feedback control unit and, possibly, of the signal processing unit may be set to predetermined settings defining a standard/normal sound and activity environment.

Figure 2:
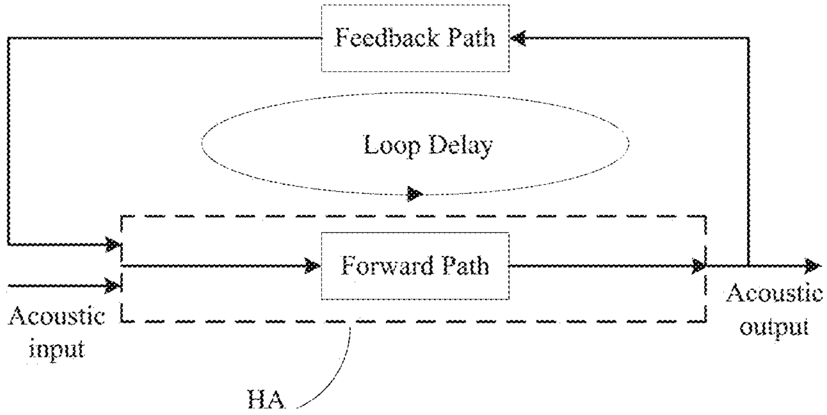
FIG. 2 shows an exemplary round-trip loop delay in a hearing aid.

FIG. 2 shows an exemplary round-trip loop delay in a hearing aid.

FIG. 2 shows that the hearing aid ('HA') may receive an acoustic input ('Acoustic input'), which is processed in the forward path ('Forward Path') of the hearing aid ('HA') and provided as an acoustic output ('Acoustic output') to the hearing aid user. A feedback signal may arise via a feedback path ('Feedback Path') from the output unit to the input unit. The feedback path ('Feedback Path') may define a round-trip loop delay ('Loop Delay'). A feedback path ('Feedback Path') may be present from the output unit (output transducer) to each input unit (input transducer).

Figure 3:
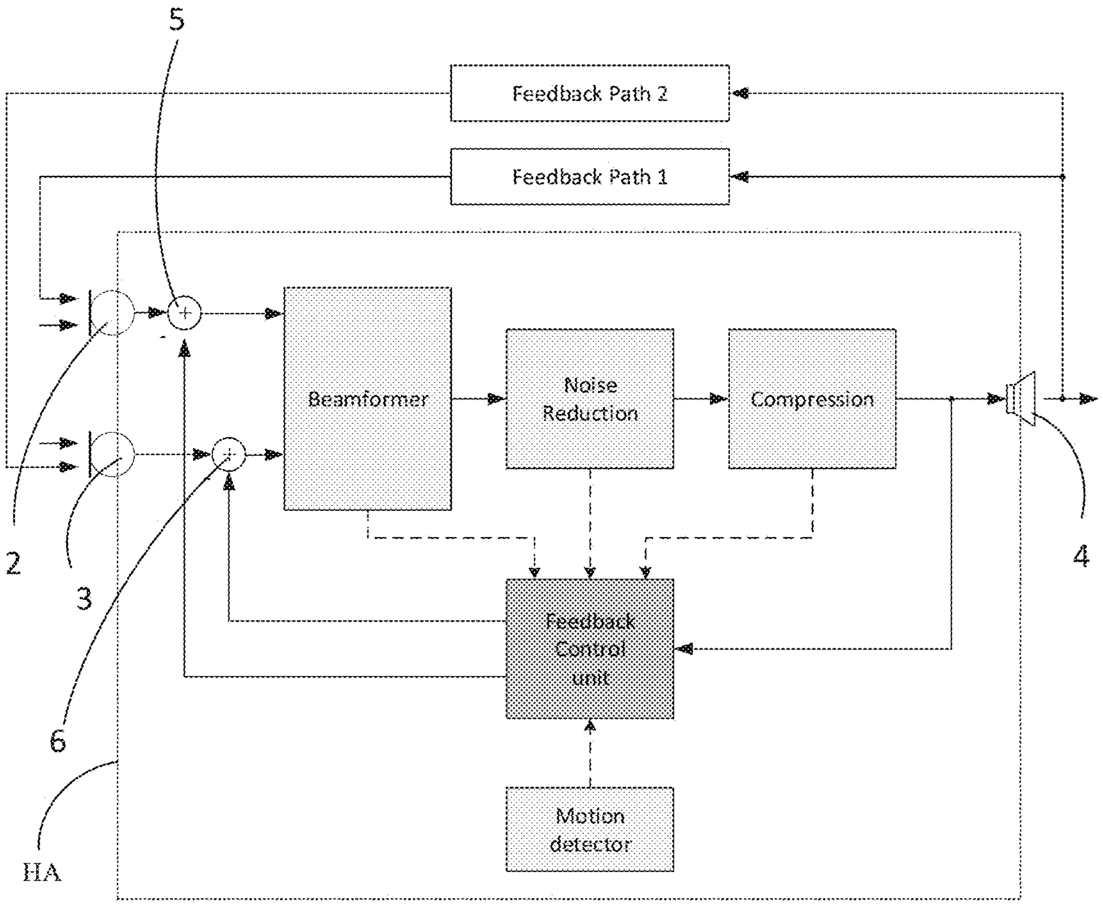
FIG. 3 shows an exemplary hearing aid comprising a feedback control unit and a motion detector.

FIG. 3 shows an exemplary hearing aid comprising a feedback control unit and a motion detector.

In FIG. 3, the hearing aid ('HA') is shown to comprise an input unit comprising a first 2 and a second input transducer 3 and an output unit comprising an output transducer 4.

A feedback path ('Feedback Path 1') may be present from the output transducer 4 to the first input transducer 2, and feedback path ('Feedback Path 2') may be present from the output transducer 4 to the second input transducer 3.

In the exemplary hearing aid ('HA') of FIG. 3, the hearing aid ('HA') is shown to comprise a motion detector ('Motion detector'). The hearing aid ('HA') may further comprise a feedback control unit ('Feedback control unit') in an analysis path, and a beamformer ('Beamformer'), a noise reduction system ('Noise reduction'), and a compression unit ('Compression') in the forward path. The signal processing unit of the hearing aid ('HA') may comprise some or all of the beamformer ('Beamformer'), the noise reduction system ('Noise reduction'), and the compression unit ('Compression') of the forward path.

As indicated by the dotted arrows, the feedback control unit ('Feedback control unit') may receive motion data from the motion detector ('Motion detector') and data from the beamformer ('Beamformer'), the noise reduction system ('Noise reduction'), and the compression unit ('Compression'). Based on the received data, the feedback control unit ('Feedback control unit') may detect and/or determine the mode of the hearing aid user, and provide a feedback control signal to the electric input signals from the first 2 and second input transducer 3 via first 5 and second combination units 6 (here a summation (subtraction) unit, '+') according to the determined mode.

Figure 4:
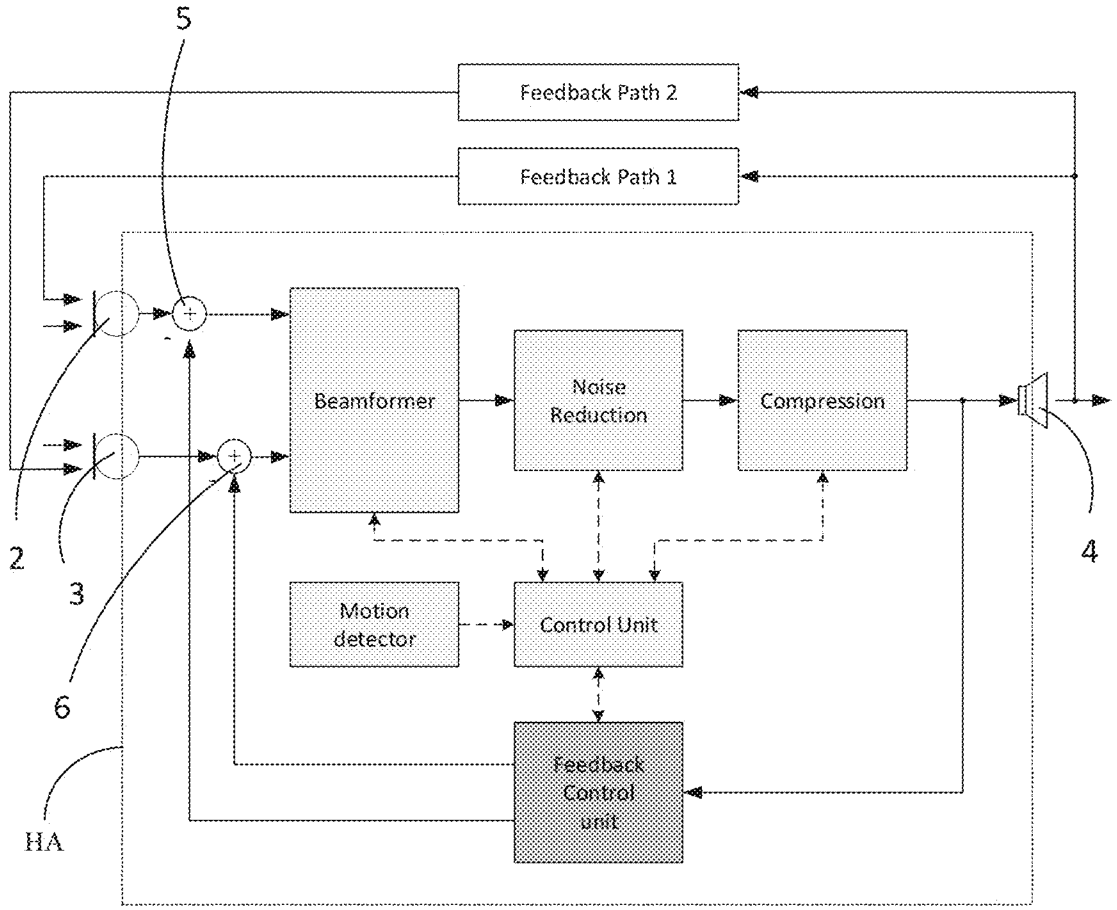
FIG. 4 shows an exemplary hearing aid comprising a feedback control unit and a motion detector.

FIG. 4 shows an exemplary hearing aid comprising a feedback control unit and a motion detector.

Compared to the exemplary hearing aid shown in FIG. 3, the exemplary hearing aid ('HA') of FIG. 4 further comprises a control unit ('Control Unit').

The control unit ('Control Unit') may instead of the feedback control unit ('Feedback control unit') receive the motion data from the motion detector ('Motion detector') and data from the beamformer ('Beamformer'), the noise reduction system ('Noise reduction'), and the compression unit ('Compression'). The control unit ('Control Unit') may also receive data from the feedback control unit ('Feedback control unit') e.g. regarding an estimate of the current feedback in the hearing aid.

Based on the received data, the control unit ('Control Unit') may detect and/or determine the mode of the hearing aid user and control the processing of the feedback control unit based on the received motion data (indicated by the two-way dotted arrow) and, possibly, based on the received data from the beamformer ('Beamformer'), the noise reduction system ('Noise reduction'), feedback control unit ('Feedback control unit'), and the compression unit ('Compression').

Based on the determined mode of the hearing aid user, the control unit ('Control Unit') may also, possibly, control the processing of the signal processing unit, as indicated by the two-way dotted arrows between the control unit ('Control Unit') and each of the beamformer ('Beamformer'), the noise reduction system ('Noise reduction'), and the compression unit ('Compression').

Figure 5:
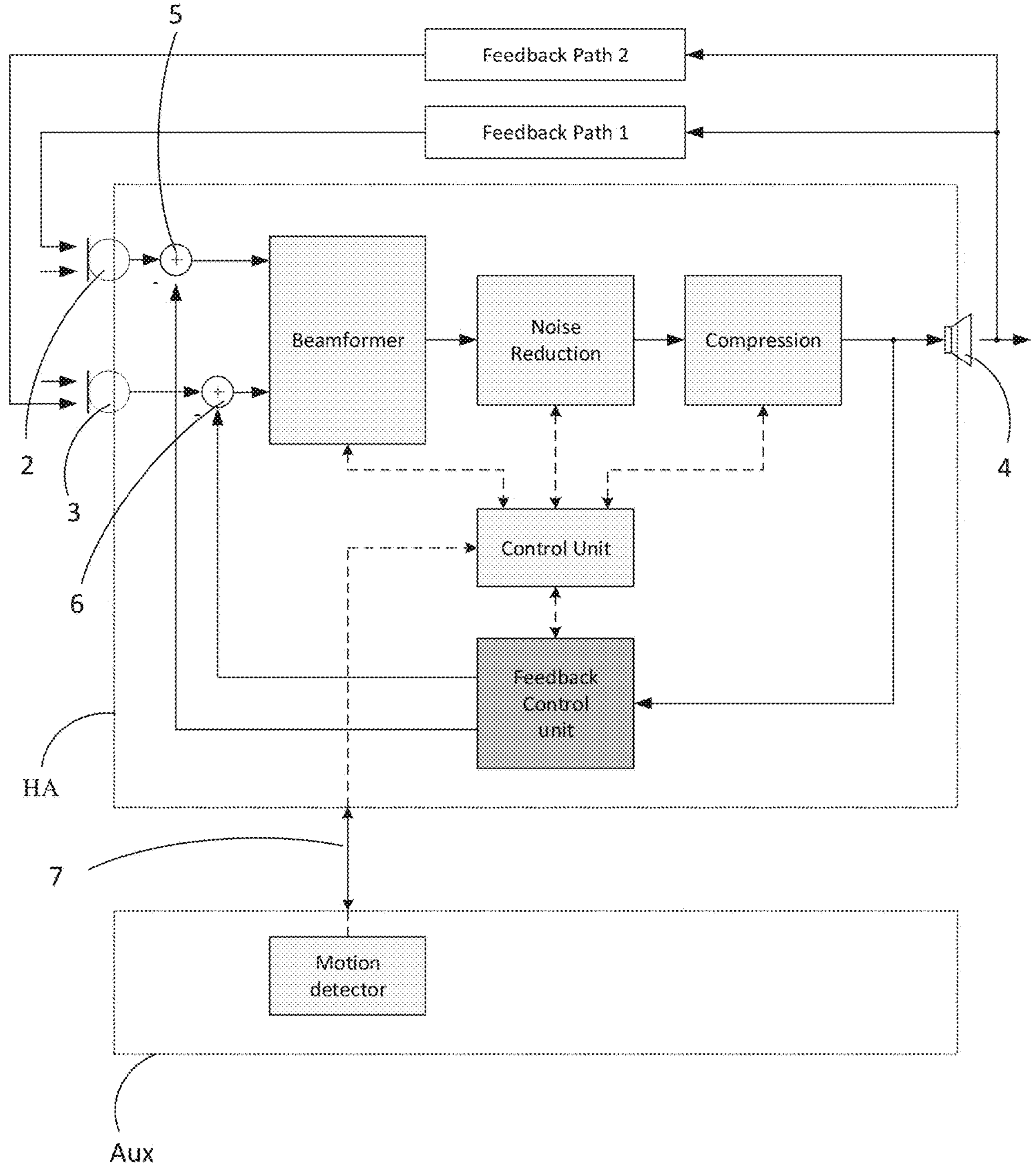
FIG. 5 shows an exemplary hearing system comprising a hearing aid and an exemplary auxiliary device comprising a motion detector.

FIG. 5 shows an exemplary hearing system comprising a hearing aid and an exemplary auxiliary device comprising a motion detector.

Compared to the exemplary hearing aid shown in FIG. 4, the exemplary hearing aid ('HA') of FIG. 5 does not comprise a motion detector.

Instead in FIG. 5, the auxiliary device ('Aux') comprises a motion detector ('Motion detector') configured to provide motion data.

It is, however, contemplated that the hearing aid ('HA') of FIG. 5 also comprises a motion detector.

The auxiliary device may comprise a remote control, a smartphone, or other portable or wearable electronic device, such as a smartwatch or the like.

The hearing system may be adapted to establish a communication link 7 (wired or wireless) between the hearing aid ('HA') and the auxiliary device ('Aux') to provide that information (e.g. control and status signals, possibly audio signals) can be exchanged or forwarded from one to the other. Further, the auxiliary device ('Aux') may send the motion data of the motion detector ('Motion detector') to the control unit ('Control unit') via the communication link 7.

Figure 6:
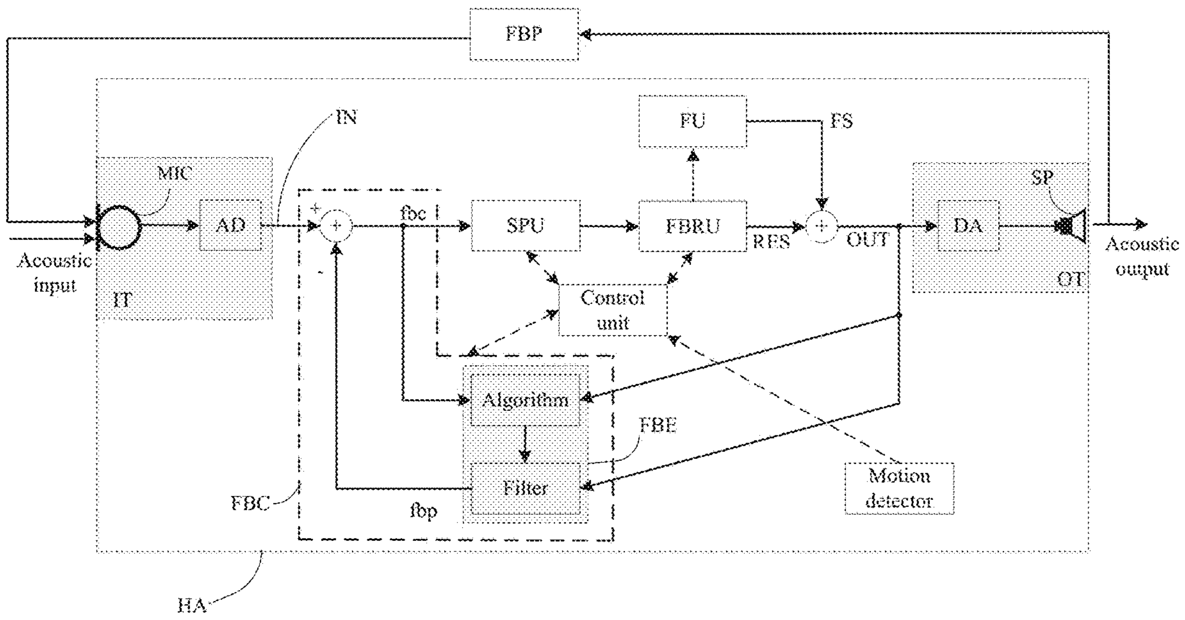
FIG. 6 shows an exemplary hearing aid comprising a feedback cancellation unit, a feedback reduction unit, a filler signal unit, a control unit, and a motion detector.

FIG. 6 shows an exemplary hearing aid comprising a feedback cancellation unit, a feedback reduction unit, a filler signal unit, a control unit, and a motion detector.

FIG. 6 shows an exemplary hearing aid (HA) comprising a feedback reduction unit (FBRU) in the forward path of the hearing aid as well as a feedback cancellation unit (FBC) comprising a feedback estimation unit (FBE) for estimating the acoustic feedback path (FBP) from the output transducer (OT) to the input transducer (IT). The feedback estimation unit (FBE) may comprise an adaptive filter comprising algorithm ('Algorithm') and filter ('Filter') units. The forward path may further comprise a combination unit ('+').

Accordingly, in FIG. 6, the feedback control unit of FIGS. 3 to 5 is shown to comprise the feedback reduction unit (FBRU) and the feedback cancellation unit (FBC).

The input transducer (IT) (of the input unit) may further comprise a microphone (MIC) for converting an input sound (Acoustic input) to an analogue electric input signal and an analogue-to-digital (AD) converter to digitize the analogue electric input signal from the microphone (MIC) with a predefined sampling rate, e.g. 20 kHz, and provide a digitized electric input signal (IN) to the forward path.

The output transducer (OT) (of the output unit) may comprise a digital-to-analogue (DA) converter to convert a digital signal (OUT) (e.g. of the combination unit ('+')) to an analogue electric output signal. Further, the output transducer (OT) may comprise a loudspeaker (SP) configured to present the analogue electric output signal to a hearing aid user as an output sound (Acoustic output).

The hearing aid (HA) may comprise a filler signal unit (FU) configured to generate a filler signal (FS) and provide it to the modulated resulting signal (RES) of the feedback reduction unit (FBRU) by the combination unit ('+'). The filler signal (FS) may be provided in one or more second time periods $T_L$, corresponding to one or more reduced forward gains $A_L$.

As also shown in FIG. 4, the hearing aid ('HA') may comprise a motion detector ('Motion detector') and a control unit ('Control unit').

The control unit ('Control Unit') may receive motion data from the motion detector ('Motion detector'), data from the signal processing unit ('SPU'), data from the feedback reduction unit (FBRU), and data from the feedback cancellation unit (FBC).

Based on the received data, the control unit ('Control Unit') may detect and/or determine the mode of the hearing aid user and control the processing of the feedback reduction unit (FBRU) and of the feedback cancellation unit (FBC), and control the processing of the signal processing unit (SPU) (indicated by the two-way dotted arrows).

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein.

Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

The invention claimed is:

1. A hearing aid configured to be worn by a hearing aid user at or in an ear of the hearing aid user, the hearing aid comprising:

an input unit configured to receive an input sound signal from an environment of a hearing aid user and to provide at least one electric input signal representing said input sound signal, an output unit configured to provide at least one set of stimuli perceivable as sound to the hearing aid user based on a processed version of said at least one electric input signal, a feedback control unit configured to reduce a risk of howl due to acoustic, electrical, and/or mechanical feedback of an external feedback path from the output unit to the input unit of said hearing aid, wherein the hearing aid is configured to receive motion data characterising movement and/or acceleration and/or orientation and/or position of the hearing aid, and is configured to determine the hearing aid or feedback control unit as being in one of a plurality of different modes comprising a head movement mode, a conversation mode, an active mode, a jaw movement mode, and a playing instruments mode, and wherein the hearing aid is configured to control processing of the feedback control unit based on the received motion data.

2. The hearing aid according to claim 1, wherein the hearing aid is configured to control processing of the signal processing unit based on the received motion data.

3. The hearing aid according to claim 2, wherein the hearing aid further comprises a control unit, and wherein the control unit is configured to control said processing of the feedback control unit and/or of said signal processing unit based on the received motion data.

4. The hearing aid according to claim 1, wherein the hearing aid further comprises a control unit, and wherein the control unit is configured to control said processing of the feedback control unit and/or of said signal processing unit based on the received motion data.

5. The hearing aid according to claim 4, wherein the control unit is configured to determine the hearing aid as being in one of a plurality of different modes based on the received motion data.

6. The hearing aid according to claim 5, wherein the hearing aid is configured to control said processing of the feedback control unit based on said determined mode of the hearing aid.

7. The hearing aid according to claim 6, wherein said determination of the hearing aid as being in one of a plurality of different modes comprises determination of the hearing aid as being in one of one or more of the following pluralities of different modes:

head movement mode,
conversation mode,
active mode,
jaw movement mode, and
playing instruments mode.

8. The hearing aid according to claim 5, wherein the control unit is configured to control said processing of the feedback control unit based on said determined mode of the hearing aid.

9. The hearing aid according to claim 8, wherein said determination of the hearing aid as being in one of a plurality of different modes comprises determination of the hearing aid as being in one of one or more of the following pluralities of different modes:

head movement mode,
conversation mode,
active mode,
jaw movement mode, and
playing instruments mode.

10. The hearing aid according to claim 5, wherein said determination of the hearing aid as being in one of a plurality of different modes comprises determination of the hearing aid as being in one of one or more of the following pluralities of different modes:

head movement mode,
conversation mode,
active mode,
jaw movement mode, and
playing instruments mode.

11. The hearing aid according to claim 5, wherein the feedback control unit comprises a feedback cancellation unit comprising an adaptive filter, and wherein the feedback control unit is configured to increase and/or decrease the adaptation speed of the adaptive filter based on said determined mode.

12. The hearing aid according to claim 4, wherein the feedback control unit is configured to determine its mode based on the received motion data.

13. The hearing aid according to claim 1, wherein the hearing aid further comprises at least one motion detector configured to provide said motion data.

14. The hearing aid according to claim 1, wherein the feedback control unit comprises a feedback reduction unit configured to modulate said forward gain in time.

15. A hearing system comprising left and right hearing aids, each of the left and right hearing aids being configured as the hearing aid according to claim 1, wherein the left and right hearing aids are configured to be worn in or at left and right ears, respectively, of said hearing aid user, and are configured to establish a wired or wireless connection between them allowing data to be exchanged between them.

16. The hearing system according to claim 15, wherein the hearing system further comprises an auxiliary device, and wherein the hearing system is configured to establish a communication link between the hearing aids and the auxiliary device to provide that information can be exchanged or forwarded from one to the other.

17. The hearing system according to claim 16, wherein the auxiliary device comprises at least one motion detector configured to provide said motion data and/or comprises a control unit configured to control said processing of the feedback control unit and/or of said signal processing unit based on the received motion data.

18. A method of processing an electric signal representing sound, the method comprising:

receiving an input sound signal from an environment of a hearing aid user and providing at least one electric input signal representing said input sound signal, by an input unit, providing at least one set of stimuli perceivable as sound to the hearing aid user based on a processed version of said at least one electric input signal, by an output unit, wherein the hearing aid comprises a feedback control unit for reducing a risk of howl due to acoustic, electrical, or mechanical feedback of an external feedback path from the output unit to the input unit of said hearing aid, receiving motion data characterising movement and/or acceleration and/or orientation and/or position of the hearing aid, determining the hearing aid or feedback control unit as being in one of a plurality of different modes comprising a head movement mode, a conversation mode, an active mode, a jaw movement mode, and a playing instruments mode, and controlling processing of the feedback control unit based on the received motion data.

* * * * *